United States Patent
Arimilli et al.

[11] Patent Number: 6,138,218
[45] Date of Patent: Oct. 24, 2000

[54] FORWARD PROGRESS ON RETRIED SNOOP HITS BY ALTERING THE COHERENCY STATE OF A LOCAL CACHE

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 09/024,616

[22] Filed: Feb. 17, 1998

[51] Int. Cl.[7] .................................................. G06F 13/00
[52] U.S. Cl. ..................... 711/146; 711/141; 711/144; 711/145
[58] Field of Search .................................. 711/141, 144, 711/145, 146

[56] References Cited

U.S. PATENT DOCUMENTS

| | | | |
|---|---|---|---|
| 5,553,266 | 9/1996 | Metzger et al. | 711/144 |
| 5,652,859 | 7/1997 | Mulla et al. | 711/146 |
| 5,710,906 | 1/1998 | Ghosh et al. | 711/146 |
| 5,713,004 | 1/1998 | Kimmel et al. | 711/146 |
| 5,737,758 | 4/1998 | Merchant | 711/146 |
| 5,796,977 | 8/1998 | Sarangdhar et al. | 709/1 |
| 5,913,226 | 6/1999 | Sato | 711/146 |
| 5,920,891 | 7/1999 | Steinbach et al. | 711/146 |

Primary Examiner—John W. Cabeca
Assistant Examiner—Fred F. Tzeng
Attorney, Agent, or Firm—Volel Emile; Felsman, Bradley, Vaden, Gunter & Dillon, LLP

[57] ABSTRACT

When a device snooping the system bus of a multiprocessor system detects an operation requesting data which is resident within a local memory in a coherency state requiring the data to be sourced from the device, the device attempts a intervention. If the intervention is impeded by a second device asserting a retry, the device sets a flag to provide historical information regarding the failed intervention. On a subsequent snoop hit to the same cache location, if the device again asserts an intervention and the snooped operation is again retried, the device undertakes an action to alter the coherency state of the requested cache item towards an ultimate coherency state expected to be the result of the original operation requesting the cache item. In the case where the requested cache item includes modified data resident in the device's local memory, the action may include a push operation writing the requested cache item to system memory. This operation may be snooped by other devices from the system bus to update their local memories. In the case where the requested cache item includes data in a coherency state other than the modified state, the action may include simply altering the coherency state to a shared or invalid state.

28 Claims, 3 Drawing Sheets

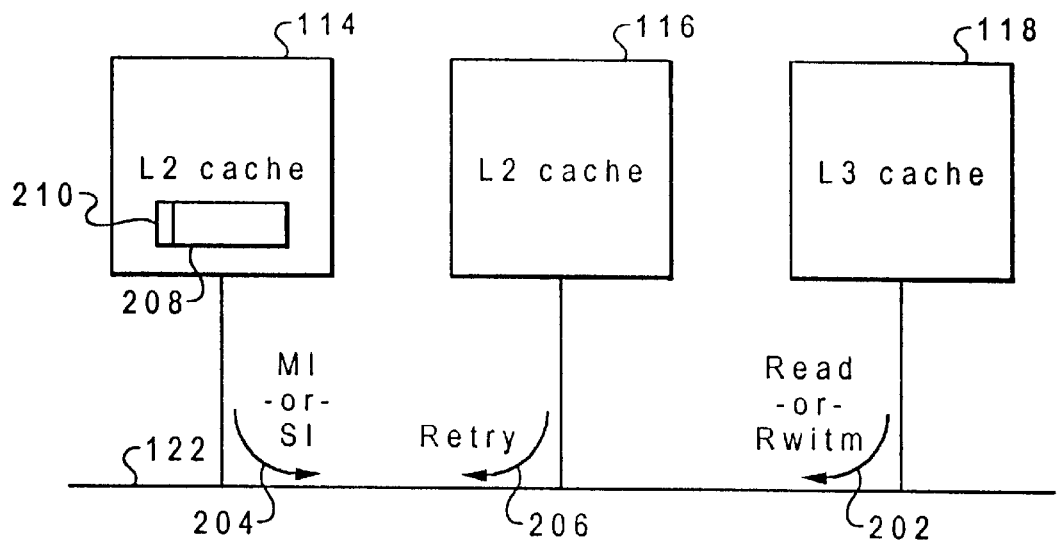
*Fig. 2*
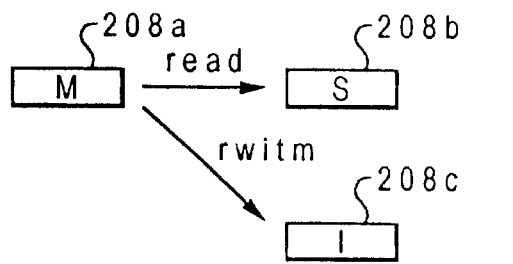
*Fig. 2A*
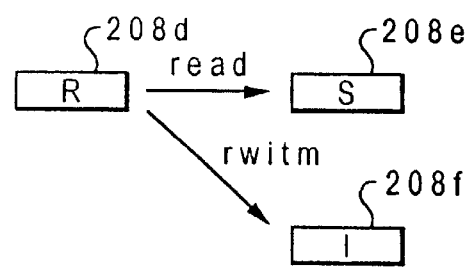
*Fig. 2B*
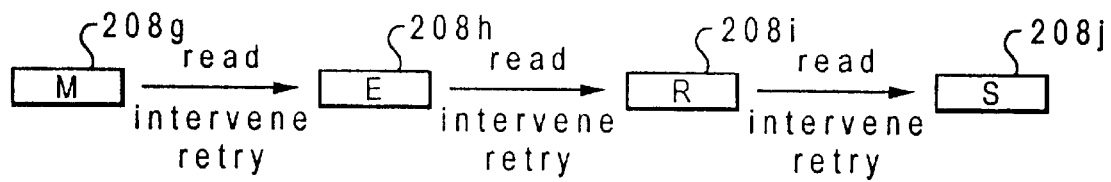
*Fig. 2C*
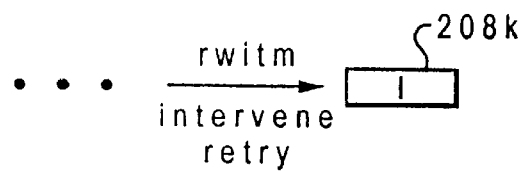

FORWARD PROGRESS ON RETRIED SNOOP HITS BY ALTERING THE COHERENCY STATE OF A LOCAL CACHE

BACKGROUND OF THE INVENTION

1. Technical Field

The present invention relates in general to snoop operations in multiprocessor systems and in particular to snoop operations initiated by one device which are retried by another device in a multiprocessor system. Still more particularly, the present invention relates to making forward progress towards an ultimate state on retried snoop operations in order to allow other traffic to proceed and alleviate the prospect of a livelock.

2. Description of the Related Art

Contemporary data processing systems employ multiple processors, multilevel cache hierarchies, or both to improve performance. A conventional symmetric multiprocessor (SMP) system employs several processing elements, which may include a processor and one or more levels of cache memory, connected via a common system bus which also couples the processing elements to any additional cache memories and to system memory. In such SMP systems, each processing element is capable of acting as a system bus master, initiating bus operations affecting the storage hierarchy. Cache controllers for additional caches in the storage hierarchy are also capable of acting as the system bus master, and of snooping bus operations initiated by other devices connected to the system bus. Devices may also intervene in snooped bus operations in order to maintain a coherent memory hierarchy.

The coherency of the storage hierarchy is maintained through the use of a selected memory coherency protocol such as the MESI protocol. In the MESI protocol, an indication of a coherency state is stored in association with each coherency granule (e.g. cache line or sector) of at least all upper level cache memories. The coherency state, which is indicated by bits in the cache directory, denotes the condition of the cache entry with respect to the same data stored in system memory: modified (M), exclusive (E), shared (S), or invalid (I) in the basic MESI coherency protocol. The modified state indicates that cache data has been modified with respect to corresponding data in system memory without also modifying the system memory data, such that the only valid copy of the data is within the cache entry storing the modified cache line or sector. The exclusive state indicates that the cache entry is consistent with system memory but is only found, within all caches at that level of the storage hierarchy, in the subject cache. The shared state indicates that the cache entry may be found in the subject cache and at least one other cache at the same level in the storage hierarchy, with all copies of the data being consistent with the corresponding data in system memory. Finally, the invalid state indicates that a cache entry—both the data and the address tag—within a given cache is no longer coherent with either system memory or other caches in the storage hierarchy.

Modifications of the basic MESI protocol may add additional states—possibly at the expense of additional bits of overhead in the cache directories—conveying other information regarding the condition of cache data as compared to corresponding data in system memory. For example, the R-MESI protocol adds the recent (R) state, essentially a variant of the shared state indicating that the cache entry may be found in both the subject cache and at least one other cache at the same level in the storage hierarchy and that all copies of the data in the subject cache and other caches are consistent with the corresponding data in system memory, but also indicating that the subject cache, of all caches containing the shared data, most recently received the data in a system bus transaction such as a read from system memory. The R state is more fully described in U.S. patent application Ser. No. 08/839,557, which is incorporated in its entirety herein by reference. Another additional coherency state which may be added to the basic MESI coherency protocol is the hovering (H) state, which indicates that an address tag stored in the tag field of a cache entry is valid but that the associated data item (e.g. cache line or cache sector) is invalid. The H state is described in greater detail in U.S. patent application Ser. No. 09/024,610 (Docket No. AT9-97-410), which is also incorporated in its entirety herein by reference.

Devices such as processors and cache controllers may intervene in snooped bus operations in order to preserve data integrity within the storage hierarchy. For example, where one device initiates a read or read with intent to modify (rwitm) request for specified data which is resident within a second device in the modified state, the second device intervenes in the bus operation for the purpose of sourcing the modified data to the requesting device (a "modified intervention"). Similarly, where data requested by a read or rwitm bus operation is resident within a device in the recent state, the device intervenes with the requested data (a "shared intervention"). In both cases, the snooping device which intervened determined that it should respond to the read or rwitm request (referred to as a "snoop hit"). In either case, however, a third device which was also snooping system bus transactions may retry the initial bus operation, effectively killing both the request and the responsive intervention.

In current designs, an intervention is typically halted with no change in coherency state when the read or rwitm request is retried, with the intervening device sourcing data when the requests ceases being retried. Processing resources are thus effectively wasted by retried snoop hits, which result in no progress being made toward achieving the data transfer which was the ultimate object of the original request. Furthermore, in some instances a pattern may develop of read or rwitm requests being repeatedly initiated and repeatedly retried without any change in the circumstances which caused the request to be retried. Such events, referred to as "livelocks," result in two or more system devices interfering with each other with no useful work being accomplished. Like endless loops, livelocks must generally be broken by external intercession.

It would be desirable, therefore, to provide a mechanism for making progress on retried snoop hits toward an ultimate resolution of the bus operations being retried. It would further be desirable for the mechanism to aid in preventing livelocks and to free snoop queues for other snoop operations.

SUMMARY OF THE INVENTION

It is therefore one object of the present invention to provide and improved method and apparatus for handling snoop operations in multiprocessor systems.

It is another object of the present invention to provide an improved method and apparatus for handling snoop operations initiated by one device and retried by another device in a multiprocessor system.

It is yet another object of the present invention to provide and method and apparatus for making forward progress towards an ultimate state on retried snoop operations in order to allow other traffic to proceed and alleviate the prospect of a livelock.

The foregoing objects are achieved as is now described. When a device snooping the system bus of a multiprocessor system detects an operation requesting data which is resident within a local memory in a coherency state requiring the data to be sourced from the device, the device attempts a intervention. If the intervention is impeded by a second device asserting a retry, the device sets a flag to provide historical information regarding the failed intervention. On a subsequent snoop hit to the same cache location, if the device again asserts an intervention and the snooped operation is again retried, the device undertakes an action to alter the coherency state of the requested cache item towards an ultimate coherency state expected to be the result of the original operation requesting the cache item. In the case where the requested cache item includes modified data resident in the device's local memory, the action may include a push operation writing the requested cache item to system memory. This operation may be snooped by other devices from the system bus to update their local memories. In the case where the requested cache item includes data in a coherency state other than the modified state, the action may include simply altering the coherency state to a shared or invalid state. If the original operation was a read operation, the transitions of the coherency state progress along a sequence terminating in the shared state. If the original operation including an indication of an intent to alter the requested cache item, such as a read with intent to modify, the coherency state transitions progress along a sequence ending in the invalid state. Rather than a flag reflecting a single failed intervention, a counter may be employed to determine when a threshold number of failed interventions has been exceeded, indicating that a possible livelock has occurred.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2 and 2A–2C are logical block diagrams of a mechanism for making forward progress on retried snoop hits, including various alternative coherency state transitions, in accordance with a preferred embodiment of the present invention.

DETAILED DESCRIPTION OF THE PREFERRED EMBODIMENT

Figure 1:
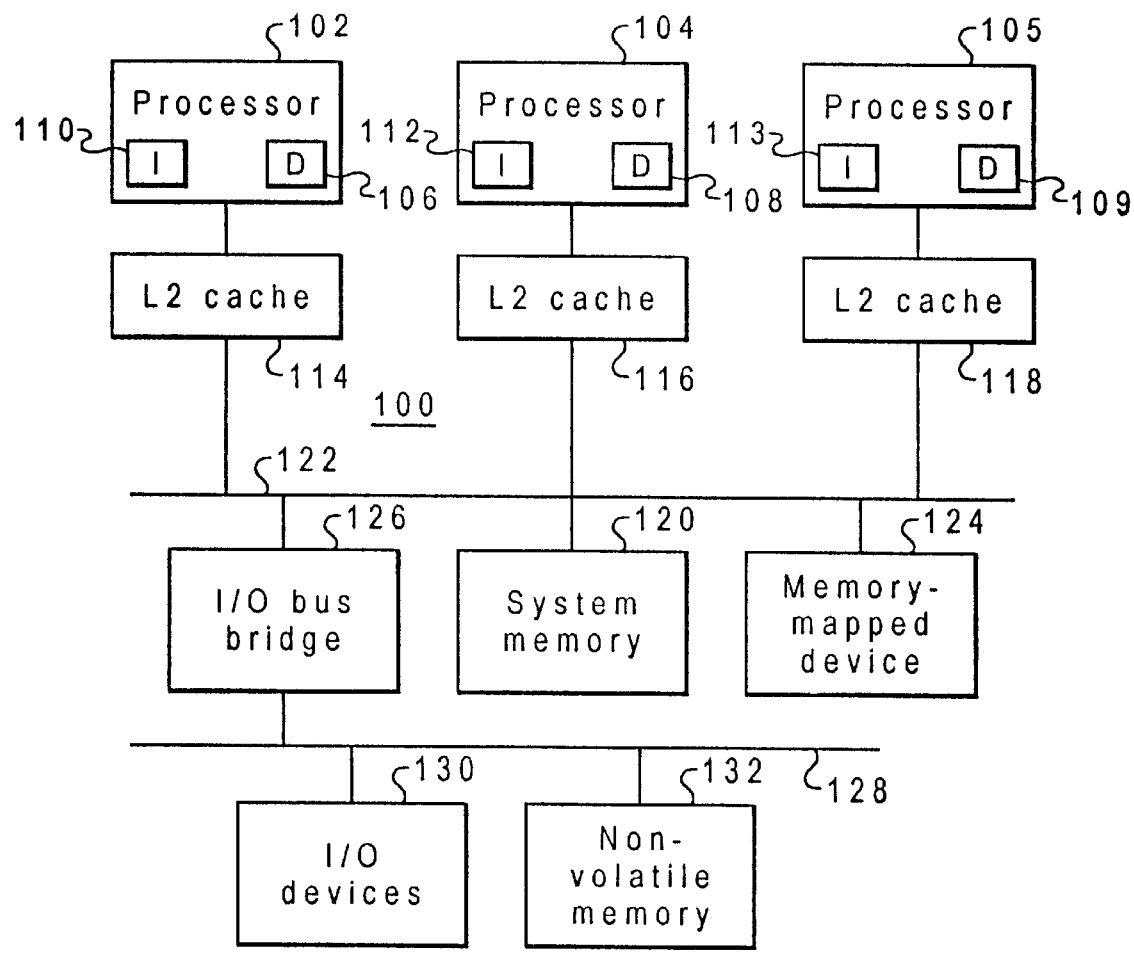
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102, 104, and 105, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102, 104, and 105 includes a level one (L1) data cache 106, 108, and 109, respectively, and an L1 instruction cache 110, 112, and 113, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114, 116, and 118. The lower cache levels—L2 caches 114, 116, and 118 and lower—are employed to stage data to the L1 caches and typically have progressively larger storage capacities but longer access latencies. For example, data caches 106, 108, and 109 and instruction caches 110, 112, and 113 may each have a storage capacity of 32 KB and an access latency of approximately 1–2 processor cycles. L2 caches 114, 116, and 118 might have a storage capacity of 512 KB but an access latency of 5 processor cycles, while level three (L3) caches, if any, may have a storage capacity of 4 MB but an access latency of greater than 15 processor cycles. L2 caches 114, 116, and 118 thus serve as intermediate storage between processors 102, 104, and 105 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114, 116, and 118 in the example shown are dedicated caches connected between their respective processors 102, 104, and 105 and system memory 120 (via system bus 122). L3 caches, if any, may be lookaside caches logically vertical with L2 caches 114, 116, and 118. As a result, data or instructions may be looked up one of L2 caches 114, 116, or 118 and a corresponding L3 cache (not shown) simultaneously, although the data or instructions will only be retrieved from an L3 cache if the respective L2 cache 114, 116, or 118 misses while the L3 cache hits. Those skilled in the art will recognize that various permutations of levels and configurations depicted may be implemented.

L2 caches 114, 116, and 118 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Nonvolatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, an optional destination tag specifying the intended recipient of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate.

Referring to FIG. 2 and 2A–2C, logical block diagrams of a mechanism for making forward progress on retried snoop hits in accordance with a preferred embodiment of the present invention are illustrated. The invention is described in connection with L2 caches 114 and 116 and L3 cache 118 and system bus 122 depicted in FIG. 1, although those skilled in the art will recognize that the invention may be implemented for other cache levels and device configurations. The cache hierarchy depicted in the exemplary embodiment is assumed to employ at least the R-MESI cache coherency protocol described above. In the present invention, a first device such as L3 cache 118 initiates a read or rwitm operation 202 on system bus 122. The requested item 208 is resident within a second device, such as L2 cache 114, in either the modified or recent state. Upon detected the read or rwitm operation 202, L2 cache 114 asserts an intervention response 204 for the purpose of sourcing the data to the requesting device. However, intervention response 204 is impeded by a second device, such as L2 cache 116, asserting a retry 206 on system bus 122. The device which attempted intervention response 204, L2 cache 114 in the example depicted, then sets a flag 210 associated with the requested cache item 208.

Should the original read or rwitm operation 202 again be initiated on system bus 122 requesting cache item 208, again be responded to by an intervention response 204 from L2 cache 114, and again be retried by a third device such as L2 cache 116, L2 cache 114 initiates an action altering the coherency state associated with requested cache item 208 in its own memory. In the case of a modified cache item 208 being requested by operation 202, for example, L2 cache 114 may initiate a push operation to write (modified) requested cache item 208 to system memory. The push operation may be snooped off the system bus by other devices for the purposes of updating their own memories with copies of requested cache item 208. If, on the other hand, the original read or rwitm operation 202 is initiated on system bus 122 requesting cache item 208 a second time and an intervention response 204 from L2 cache 114 is not impeded by a retry response 206 from a third device, the intervention proceeds in a normal fashion.

It is noteworthy that, in systems supporting a coherency protocol including the hovering state, the push operation allows other devices within the system which have the requested cache item in the hovering state to update the data associated with the address tag for the requested cache item in their local (cache) memory, such that the coherency state for the requested cache item transitions to a shared state in that local memory.

Following the push operation, requested cache item 208 then transitions to a shared or invalid coherency state in L2 cache 114, depending on the original operation 202. For example, as depicted in FIG. 2A, if operation 202 was merely a read operation, cache item 208 would transition from a modified state 208a to a shared state 208b; on the other hand, if operation 202 was a rwitm operation, cache item 208 would transition from a modified state 208a to an invalid state 208c. In either case, however, L2 cache 114 progresses toward an ultimate state and gets out of the way of other bus traffic which may be initiated by other devices. Should read or rwitm operation 202 again provoke retry response 206 and be subsequently initiated for a third time, L2 cache 114 need not assert a modified intervention 204 to the reinitiated operation.

Similarly, in the case of a cache item in the recent coherency state being requested by operation 202, L2 cache 114 may simply alter the coherency state of the requested cache item 208 from a recent coherency state 208d to a shared state 208e if the operation was a read or to an invalid state 208f if the operation was a rwitm, as depicted in FIG. 2B. In the embodiment currently being described, the coherency state of requested cache item 208 which was the object of a previous failed intervention is altered regardless of whether operation 202 is retried or not during the second attempt. Should operation 202 be retried and subsequently reinitiated for a third attempt, L2 cache 114 need not assert a shared intervention with respect to requested cache item 208. The coherency state of requested cache item 208 has been altered to match the final state anticipated after completion of the original operation 202. Other system bus operations which might have comprised the impediment to an intervention are thus free to be executed to completion. The potential for the intervention and the other operation to each prevent the other from being executed to completion, such that the system acquires the essentially suspended state of a livelock where operations are repeatedly initiated and retried, is avoided.

In general terms, the mechanism of the present invention for making forward progress on retried snoop hits involves undertaking an action, in response to detecting an operation on the system bus which was the subject of a previous failed intervention, which moves the coherency state of a requested cache item toward the expected coherency state at the completion of the original operation. This alteration of the coherency state of a requested cache item by a device may be performed in lieu of attempting to intervene for a second time, and is intended to obviate the need for subsequent interventions should the operation be retried and reinitiated more than once. For example, suppose L3 cache 118 initiates a read or rwitm operation on system bus 122. A second device, such as L2 cache 114, responds with either a modified or shared intervention 204 on system bus 122 and a third device, such as L2 cache 116, asserts retry 206. Upon intervention 204 being stopped by retry 206, L2 cache 114 sets a flag indicating that the requested cache item has been the subject of a failed intervention. Upon detecting the same operation again through its snoop logic, and detecting the operation being retried again, L2 cache 114 initiates the action intended to achieve forward progress, a push operation for cache item 208 in a modified coherency state and/or alteration of the coherency state of cache item 208 to a shared or invalid coherency state, as described above. A single flag for each cache item (i.e., cache line, sector, or block, depending on the granularity of cache operations) may be utilized to distinguish cache items which have been the subject of a retried intervention from those which have not. Separate flags may be utilized to distinguish cache items in modified state 208a which have been the subject of retried interventions from similar cache items in recent state 208d. Alternatively, the same flag may be utilized for making forward progress from either initial coherency state. This flag associated with requested cache item 208 may be simply set in software, or dedicated hardware may be implemented for this purpose. Of course, the principle may be easily extended to count the number of times an operation and intervention are retried and, once a certain threshold is reached, make forward progress as described above. A hardware or software counter may be implemented for this purpose, with the threshold selected to reflect a determination that a possible livelock has been created by the operation and intervention being repeatedly initiated and retried.

Depending on the coherency protocol supported and design preferences, the present invention may be implemented to transition through all or a large portion of the different coherency states in making forward progress toward ultimate resolution of an operation and intervention which are being repeatedly retried. A device may be configured to make forward progress each time an intervention with respect to a requested cache item which is not in the shared or invalid coherency state gets retried. That is, other than cases in which a requested cache item is shared or invalid (for which no intervention is necessary) each time an intervention gets retried the device attempts to perform work moving the coherency state of a requested cache item toward an ultimate anticipated coherency state. For example, assuming the R-MESI coherency protocol is supported, where the requested cache item was initially in a modified state 208g the device asserts a modified intervention in response to a read request. If the modified intervention is impeded by another device asserting a retry, the push operation may be initiated to write the requested cache item to system memory. Provided the hovering state described earlier is not implemented, the device need not assume that the push operation is snooped off the system bus by other devices, but may simply alter the coherency state of the requested cache item to an exclusive state 208h. Upon a subsequent initiation of the same read operation, the device drives a shared intervention. If the shared intervention is impeded by a retry signal, the device may alter the coherency state of the requested cache item to a recent state 208i. No operation need be initiated since alteration of the coherency state merely reflects an effort by the device to make forward progress toward an ultimate coherency state. Similarly, upon a subsequent initiation of the read operation, the device again drives a shared intervention. If this shared intervention is retried, the device may alter the coherency state of the requested cache item to a shared state 208j, the expected coherency state of the requested item should the read operation be successfully completed. Again, no operation need be initiated since the device is simply attempting to make forward progress toward ultimate result of the operation being initiated.

If the operation being initiated and causing an intervention to be initiated is a rwitm rather than a read, the chain of coherency states depicted will progress toward an invalid state 208k rather than shared state 208j. All or only part of the coherency state transitions depicted in FIG. 2C may be utilized in making forward progress in accordance with the present invention, depending on design choice. Additionally, each coherency state transition may be undertaken as a result of a threshold number of interventions rather than a single intervention being impeded.

Figure 3:
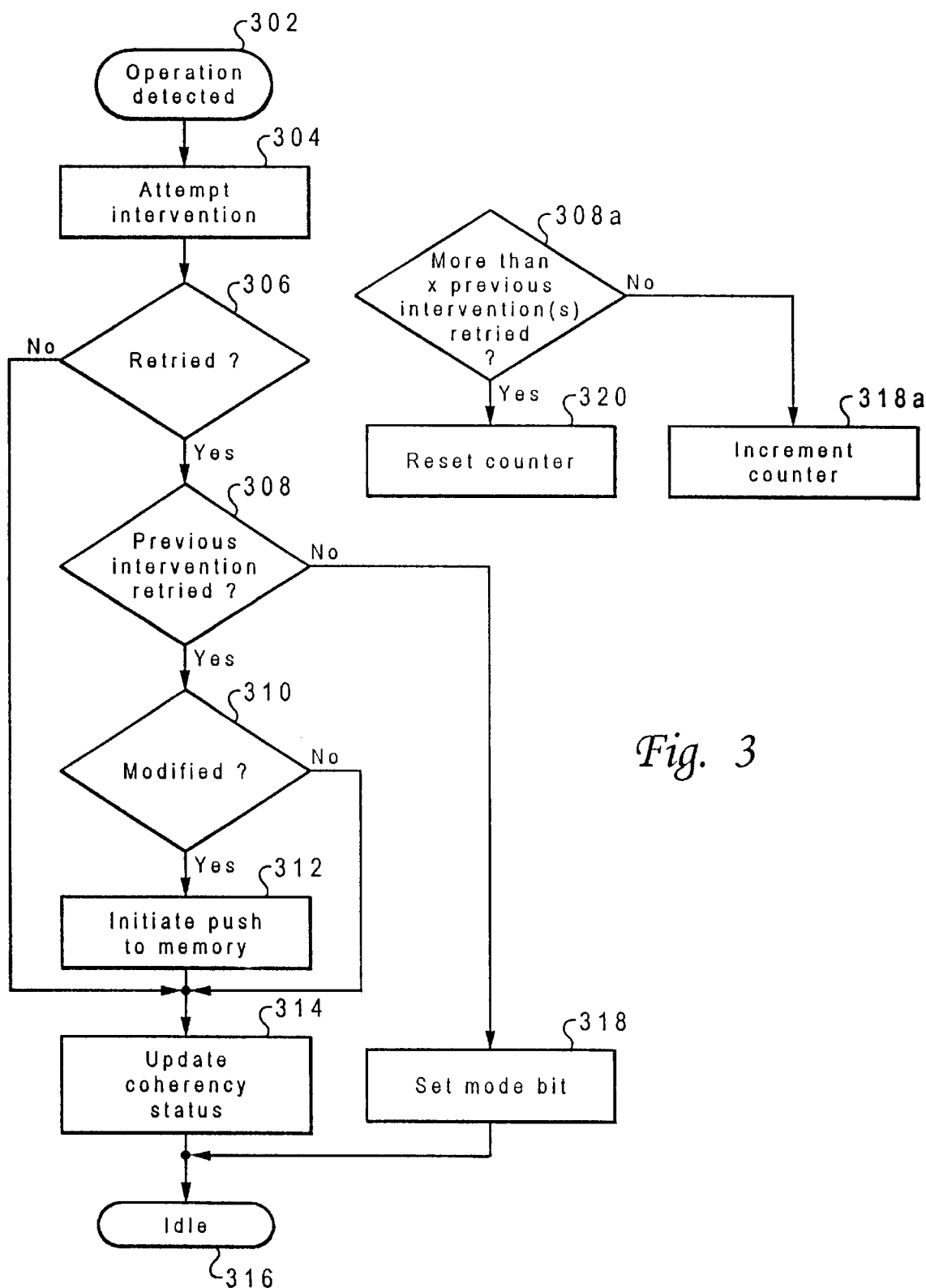
FIG. 3 depicts a high level flowchart for a process of responding to retried interventions in accordance with a preferred embodiment of the present invention.

With reference now to FIG. 3, a high level flowchart for a process of responding to retried interventions in accordance with a preferred embodiment of the present invention is depicted. The process begins at step 302, which depicts detecting, as a result of a snoop hit, an operation for which requested data should be sourced from a local or cache memory (i.e., the requested data is resident in the local or cache memory in a modified, recent, or equivalent coherency state). The process next passes to step 304, which illustrates attempting to intervene in the snooped operation, and then to step 306, which depicts a determination of whether the attempted intervention has been impeded by a retry. If not, the process proceeds to step 314, which depicts updating the coherency status of the requested data item, and then to step 316, which illustrates the process becoming idle until the next snoop hit, allowing the intervention to proceed in a normal fashion. If the attempted intervention was impeded by a retry, however, the process proceeds instead to step 308, which illustrates a determination of whether a previous intervention was retried.

The determination of whether a previous intervention was retried may be made based on historical information represented by setting a flag associated with the requested cache item as described earlier. If a previous intervention had been retried, the process proceeds to step 310, which depicts a determination of whether the requested data item is in a modified coherency state. If so, the process proceeds to step 312, which illustrates initiating a push to memory in order to preserve data integrity, and then to step 314, which depicts updating the coherency state of the requested cache item. However, the push operation is undertaken with the same objective as actions which modify the coherency state without initiating an operation: moving the coherency state towards a final expected coherency state, allowing other operations to proceed. Thus, referring back to step 310, if the requested data item was not in a modified state, the process proceeds instead directly to step 314, which illustrates updating the coherency state of the requested cache item.

Referring again to step 308, if no previous intervention with respect to the requested cache item had been initiated, the process proceeds instead to step 318, which depicts setting the flag associated with the requested cache item to indicate that an intervention with respect to that item has been retried. From either of steps 314 or 318, the process then passes to step 316, which illustrates the process becoming idle until the next snoop hit.

An alternative to the process portion depicted in steps 308 and 318 is shown in steps 308a and 318a. Rather than a determination of whether a single attempted intervention had been retried, step 308 may involve a determination of whether a threshold number x of attempted interventions with respect to the requested cache item have been retried. Thus, the process includes a determination of whether more than x interventions have been retried as depicted in step 308a, a determination which may be made by examining a counter configured to count retried interventions. If more than the threshold number of interventions have been retried, the process includes resetting the counter after the coherency state has been altered, as illustrated in step 320, between steps 308a and 310. If the threshold has not yet been exceeded, however, the process increments the counter as depicted in step 318a.

The present invention helps a multiprocessor system avoid livelocks, frees the snoop queues of devices within the system for other work, and helps system throughput when all bus participants in the system become very busy. Snoop hits to cache locations where previous snoop hits have been retried are advanced toward an ultimate resolution of the data coherency states. If necessary, data may be pushed onto the system bus where it is accessible to be snooped by other devices, allowing cache items in the hovering state, where such a coherency state is supported, to migrate to the shared state more quickly.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of making forward progress on retried snoop hits, comprising:

snooping operations initiated by remote devices within a system storage hierarchy;

responsive to detecting an operation including an address tag associated with a data item contained in a local data storage, checking a coherency state of the data item;

responsive to determining that the coherency state indicates that the data item should be retrieved from the local data storage rather than other portions of the storage hierarchy, asserting an intervention; and responsive to having the intervention retried, altering a coherency state of the data item in the local storage to preclude a subsequent intervention of a same type as the intervention for subsequent operations including the address tag associated with the data item.

2. The method of claim 1, wherein the step of asserting an intervention further comprises:

responsive to determining that the coherency state indicates that the data item is modified with respect to a corresponding data item within a system memory, asserting a modified intervention.

3. The method of claim 2, wherein the step of altering the coherency state of the data item in the local storage further comprises:

initiating an operation writing the modified data item to the system memory.

4. The method of claim 3, wherein the step of altering the coherency state of the data item in the local storage further comprises:

altering the coherency state to a shared state.

5. The method of claim 3, wherein the step of altering the coherency state of the data item in the local storage further comprises:

altering the coherency state to an invalid state.

6. The method of claim 3, further comprising:

determining whether the operation indicates an intent to modify the data item, wherein the step of altering the coherency state of the data item in the local storage comprises altering the coherency state to a shared state if the operation does not indicate an intent to modify the data item and altering the coherency state to an invalid state if the operation indicates an intent to modify the data item.

7. The method of claim 1, wherein the step of asserting an intervention further comprises:

responsive to determining that the coherency state indicates that the data item was most recently retrieved from a system memory, asserting a shared intervention.

8. The method of claim 7, wherein the step of altering the coherency state of the data item in the local storage further comprises:

altering the coherency state to a shared state.

9. The method of claim 7, wherein the step of altering the coherency state of the data item in the local storage further comprises:

altering the coherency state to an invalid state.

10. The method of claim 1, further comprising:

setting a flag associated with the local data storage indicating that an attempted intervention has been retried.

11. The method of claim 1, further comprising:

responsive to having the intervention retried, checking a flag associated with the local data storage and having a first state indicating that a previous attempted intervention was retried, wherein the step of altering the coherency state of the data item comprises altering the coherency state responsive to determining that the flag is in the first state.

12. The method of claim 1, further comprising:

incrementing a counter associated with the local data storage indicating a number of times that an attempted intervention has been retried.

13. The method of claim 1, further comprising:

responsive to having the intervention retried, checking a value within a counter associated with the local data storage and indicating a number of times that a previous attempted intervention was retried, wherein the step of altering the coherency state of the data item comprises altering the coherency state responsive to determining that the value within the counter exceeds a threshold value.

14. A data processing system, comprising:

a first storage connected to a system bus;

first logic for a second storage connected to the system bus and snooping operations initiated by the first storage and, in response to detecting an operation including an address tag associated with a data item within the second storage, checking a coherency indicator for the data item;

second logic asserting an intervention in response to detecting a coherency state for the data item which indicates that the data item should be sourced from the second storage; and third logic altering the coherency state of the data item in the second storage in response to the intervention being retried to preclude a subsequent intervention of a same type as the intervention for subsequent operations including the address tag associated with the data item.

15. The data processing system of claim 14, wherein:

the coherency state indicates that the data item is modified with respect to a corresponding data item within a system memory; and the second logic asserts a modified intervention.

16. The data processing system of claim 15, wherein the third logic initiates an operation writing the modified data item to the system memory and alters the coherency state to a shared state in response to the intervention being retried.

17. The data processing system of claim 15, wherein the third logic initiates an operation writing the modified data item to the system memory and alters the coherency state to an invalid state in response to the intervention being retried.

18. The data processing system of claim 14, further comprising:

a flag associated with the second storage and indicating whether a previous intervention was retried.

19. The data processing system of claim 18, wherein the third logic alters the coherency state of the data item in response to the intervention being retried while the flag is set.

20. The data processing system of claim 14, further comprising:

a counter associated with the second storage and containing a count of a number of times a previous intervention was retried.

21. A method of making forward progress on retried snoop hits, comprising:

responsive to detecting a data transaction requesting a cache line contained within a cache in a modified coherency state, asserting a modified intervention to the data transaction; and responsive to detecting a retry response from another cache to the data transaction,
pushing modified data from the cache to a system memory, and
altering a coherency indicator for the cache line to a shared coherency state to preclude a subsequent modified intervention for subsequent operations including an address tag associated with the cache line.

22. The method of claim 21, wherein the data transaction is a second data transaction, the method further comprising:

responsive to detecting a first data transaction requesting the cache line contained within the cache in the modified coherency state, asserting a modified intervention to the first data transaction; and responsive to detecting a retry response from another cache to the first data transaction, setting a flag associated with the cache line to indicate the retried intervention.

23. A method of making forward progress on retried snoop hits, comprising:

responsive to detecting a data transaction requesting a cache line contained within a cache in a recent coherency state, asserting a shared intervention to the data transaction; and responsive to detecting a retry response from another cache to the data transaction, altering a coherency indicator for the cache line to a shared coherency state to preclude a subsequent intervention of a same type as the shared intervention on the cache line in the recent coherency state for subsequent operations including an address tag association with the cache line.

24. The method of claim 23, wherein the data transaction is a second data transaction, the method further comprising:

responsive to detecting a first data transaction requesting the cache line contained within the cache in the recent coherency state, asserting a shared intervention to the first data transaction; and responsive to detecting a retry response from another cache to the first data transaction, setting a flag associated with the cache line to indicate the retried intervention.

25. A system for making forward progress on retried snoop hits, comprising:

a cache coupled to a system bus and containing a cache line in a modified coherency state, the cache asserting a modified intervention on the system bus in response to detecting a data transaction on the system bus requesting the cache line; and an other cache coupled to the system bus, wherein the cache, in response to detecting a retry response to the data transaction from the other cache on the system bus,
pushes modified data from the cache to a system memory, and
alters a coherency indicator for the cache line to a shared coherency state to preclude a subsequent modified intervention for subsequent operations including an address tag associated with the cache line.

26. The system of claim 25, wherein the data transaction is a second data transaction, the system further comprising:

a flag associated with the cache line to indicate that the cache line was a subject of a retried intervention, wherein the cache, in response to detecting a first data transaction requesting the cache line contained within the cache in the modified coherency state, asserts a modified intervention to the first data transaction, and, in response to detecting a retry response from another cache to the first data transaction, sets the flag.

27. The system of claim 25, wherein the data transaction is a second data transaction, the system further comprising:

a flag associated with the cache line to indicate that the cache line was a subject of a retried intervention, wherein the cache, in response to detecting a first data transaction requesting the cache line contained within the cache in the recent coherency state, asserts a shared intervention to the first data transaction, and, in response to detecting a retry response from another cache to the first data transaction, sets the flag.

28. A system for making forward progress on retried snoop hits, comprising:

a cache coupled to a system bus and containing a cache line in a recent coherency state, the cache asserting a shared intervention on the system bus in response to detecting a data transaction on the system bus requesting the cache line; and an other cache coupled to the system bus, wherein the cache, in response to detecting a retry response to the data transaction from the other cache on the system bus, alters a coherency indicator for the cache line to a shared coherency state to preclude a subsequent intervention of a same type as the shared intervention on the cache line in the recent coherency state for subsequent operations including an address tag associated with the cache line.

* * * * *